United States Patent
Nakamura et al.

(10) Patent No.: US 11,605,988 B2
(45) Date of Patent: Mar. 14, 2023

(54) METHOD FOR MANUFACTURING LAMINATED IRON CORE

(71) Applicant: MITSUI HIGH-TEC, INC., Kitakyushu (JP)

(72) Inventors: Shuichi Nakamura, Fukuoka (JP); Daisuke Momota, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 400 days.

(21) Appl. No.: 15/874,222

(22) Filed: Jan. 18, 2018

(65) Prior Publication Data

US 2018/0212478 A1    Jul. 26, 2018

(30) Foreign Application Priority Data

Jan. 26, 2017  (JP) .............................. JP2017-012358

(51) Int. Cl.
| | |
|---|---|
| *H02K 15/02* | (2006.01) |
| *H01F 41/02* | (2006.01) |
| *H02K 1/06* | (2006.01) |
| *F16D 27/00* | (2006.01) |
| *H02K 1/14* | (2006.01) |

(52) U.S. Cl.
CPC .............. *H02K 1/06* (2013.01); *F16D 27/004* (2013.01); *H02K 1/148* (2013.01); *H02K 15/022* (2013.01);
(Continued)

(58) Field of Classification Search
CPC ...... H02K 15/0222; H02K 1/06; H02K 1/141; H02K 1/148; H02K 2213/03;
(Continued)

(56) References Cited

U.S. PATENT DOCUMENTS 5,044,237 A * 9/1991 Frame .................. H02K 15/022
29/598
6,484,387 B1 * 11/2002 Lee .................. Y10T 29/49078
29/596
(Continued)

FOREIGN PATENT DOCUMENTS

CN      102057556 A    5/2011
JP       51-50401 A    5/1976
(Continued)

OTHER PUBLICATIONS

Machine Translation (English) of Japanese Patent Publication JP 2011-87374, Dec. 2020. (Year: 2020).*
(Continued)

*Primary Examiner* — A. Dexter Tugbang
(74) *Attorney, Agent, or Firm* — Greenblum & Bernstein, P.L.C.

(57) ABSTRACT

A method for manufacturing a laminated iron core includes providing a plurality of annular iron core piece rows, each of which is configured by annularly arranging a plurality of divided iron core pieces including yokes and teeth, and the yokes of the annularly-adjacent divided iron core pieces in the annular iron core piece row are mutually different in shape. In the method, the annular iron core piece rows are laminated by changing a rotational angle of the newly laminated annular iron core piece row relatively to the lastly laminated annular iron core piece row laminated so that the divided iron core piece with a shape different from that of the divided iron core piece is laminated on the lastly laminated divided iron core piece.

16 Claims, 12 Drawing Sheets

(52) U.S. Cl.
CPC .......... *H01F 41/0213* (2013.01); *H02K 1/141* (2013.01); *H02K 15/02* (2013.01); *H02K 2213/03* (2013.01); *Y10T 29/49009* (2015.01); *Y10T 29/49078* (2015.01); *Y10T 29/5317* (2015.01)

(58) Field of Classification Search
CPC .... H02K 15/022; H02K 15/02; F16D 27/004; Y10T 29/49009; Y10T 29/49078; Y10T 29/5317; H01F 41/0213
See application file for complete search history.

(56) References Cited

U.S. PATENT DOCUMENTS

| | | |
|---|---|---|
| 2011/0047780 A1 | 3/2011 | Akita et al. |
| 2012/0043848 A1* | 2/2012 | Neuenschwander ........................ H02K 15/022 310/216.043 |
| 2013/0169104 A1* | 7/2013 | Jang ..................... H02K 15/022 310/216.009 |

FOREIGN PATENT DOCUMENTS

| | | | |
|---|---|---|---|
| JP | 2008-92770 | | 4/2008 |
| JP | 2011-87374 | A | 4/2011 |
| JP | 2011-188650 | A | 9/2011 |
| JP | 2013-115942 | | 6/2013 |
| JP | 2014192917 | A * | 10/2014 |
| WO | 2010010599 | | 1/2010 |

OTHER PUBLICATIONS

J. Kim, "Fabrication of highly-nanolaminated metal inductor core by pressing and punching," 2017 IEEE 12th International Conference on Nano/Micro Engineered and Molecular Systems (NEMS), 2017, pp. 661-664, doi: 10.1109/NEMS.2017.8017108. (Year: 2017).*

* cited by examiner

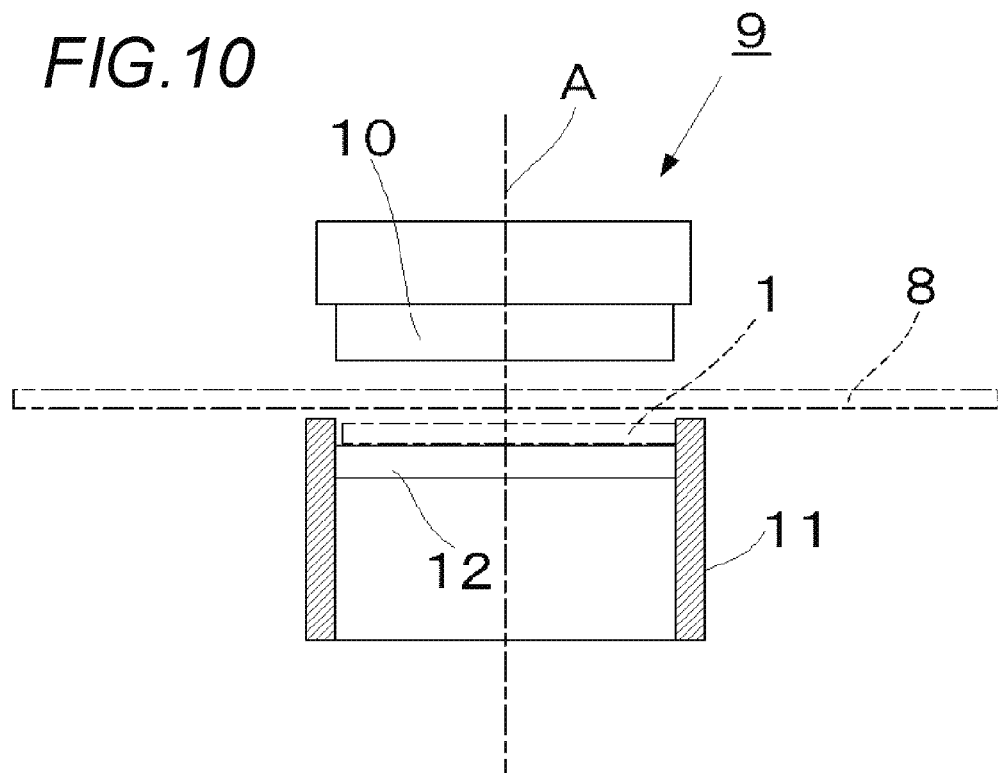

METHOD FOR MANUFACTURING LAMINATED IRON CORE

CROSS REFERENCE TO RELATED APPLICATION

This application is based upon and claims the benefit of priority of Japanese Patent Application No. 2017-012358 filed on Jan. 26, 2017, the contents of which are incorporated herein by reference in its entirety.

BACKGROUND OF THE INVENTION

1. Field of the Invention

The present invention relates to a method for manufacturing a laminated iron core manufactured by laminating annular iron core piece rows formed by annularly arranging a plurality of divided iron core pieces.

2. Description of the Related Art

In the case of manufacturing an armature constructing a rotary electrical machine, annular iron core piece rows formed by annularly arranging a plurality of divided iron core pieces are laminated, and a laminated iron core formed by annularly arranging a plurality of divided laminated iron cores is manufactured. The manufactured laminated iron core is disassembled for each of divided laminated iron core, and a winding is wound on each of the divided laminated iron cores. Then, by coupling the divided laminated iron cores on which the windings are wound again, the armature is completed.

JP-A-2008-92770 as Patent Literature 1 describes a method for manufacturing a laminated iron core by laminating two kinds of annular iron core piece rows alternately in twos. According to the manufacturing method described in Patent Literature 1, one annular iron core piece row and the other annular iron core piece row are constructed so that shapes of the circumferential ends of divided iron core pieces constructing the annular iron core piece rows differ. As a result, both circumferential ends of divided laminated iron cores are formed with uneven parts (Patent Literature 1, FIG. 4). And, the plurality of divided laminated iron cores constructing the laminated iron core are mutually coupled by mutually meshing the uneven parts. As a result, a shape of the laminated iron core is resistant to being lost at the time of detaching the laminated iron core from a lamination apparatus. Also, after windings are wound on the divided laminated iron cores and the divided laminated iron cores are again coupled, the shape of the laminated iron core is resistant to being lost. As a result, an armature including the laminated iron core manufactured by the method described in Patent Literature 1 has a merit of making mechanical strength and mechanical reliability higher than a conventional product.

Patent Literature 1: JP-A-2008-92770

SUMMARY OF THE INVENTION

A die unit included by a press apparatus used in the method described in Patent Literature 1 is constructed so as to arrange stations respectively corresponding to two kinds of annular iron core piece rows together with other stations in series. A strip plate of an electromagnetic steel plate which is a material of the annular iron core piece is conveyed between the stations, and is sequentially processed (refer to Patent Literature 1, FIG. 3). The die unit described in FIG. 3 of Patent Literature 1 includes a first station used in processing of one annular iron core piece row, and a second station used in processing of the other annular iron core piece row. Also, in the method described in Patent Literature 1, one annular iron core piece row and the other annular iron core piece row are alternately manufactured and are alternately laminated. As a result, in the case of manufacturing one annular iron core piece row, the strip plate skips the second station and is conveyed, and in the case of manufacturing the other annular iron core piece row, the strip plate skips the first station and is conveyed.

Since the die unit included by the press apparatus used in the method described in Patent Literature 1 includes the dedicated stations for respectively processing the two kinds of annular iron core piece rows in this manner, the whole length becomes long. As a result, the method described in Patent Literature 1 requires a large-sized press apparatus. Also, since it is necessary to skip an unnecessary step (station) in continuous press steps (stations), a mechanical configuration of the die unit becomes complicated. Also, control of the press apparatus becomes complicated. Because of such circumstances, the method described in Patent Literature 1 has a problem of requiring expensive manufacturing equipment.

The present invention has been implemented in view of such circumstances, and a non-limited object of the present invention is to provide a method for manufacturing a laminated iron core, the method for laminating annular iron core piece rows capable of being manufactured in a single press step and forming both circumferential ends of divided laminated iron cores with uneven parts.

A method for manufacturing a laminated iron core according to an aspect of the present invention includes: providing a plurality of annular iron core piece rows, each of which is configured by annularly arranging a plurality of divided iron core pieces including yokes and teeth so as to mutually abut ends of the yokes, wherein the yokes of the annularly-adjacent divided iron core pieces in the annular iron core piece row are mutually different in shape; and repeating the following laminations: laminating the annular iron core piece rows by a certain number so that the divided iron core piece with the same shape as that of the divided iron core piece is laminated on the divided iron core piece; and laminating the annular iron core piece rows by changing a rotational angle of the newly laminated annular iron core piece row relatively to the lastly laminated annular iron core piece row laminated so that the divided iron core piece with a shape different from that of the divided iron core piece is laminated on the lastly laminated divided iron core piece.

A method for manufacturing a laminated iron core according to another aspect of the present invention includes: providing a plurality of annular iron core piece rows, each of which is configured by annularly arranging a plurality of divided iron core pieces including yokes and teeth so as to mutually abut ends of the yokes, wherein the yokes of the annularly-adjacent divided iron core pieces in the annular iron core piece row are mutually different in shape; and repeating lamination of the annular iron core piece rows by changing a rotational angle of the newly laminated annular iron core piece row relatively to the lastly laminated annular iron core piece row so that the divided iron core piece with a shape different from that of the divided iron core piece is laminated on the lastly laminated divided iron core piece.

The method for manufacturing the laminated iron core may be configured so that the rotational angle of the newly laminated annular iron core piece row is changed relatively to the lastly laminated annular iron core piece row by changing the rotational angle of the previously laminated annular iron core piece rows.

The method for manufacturing the laminated iron core may be configured so that a contour of a plane shape of at least one end of the yoke of the divided iron core piece differs from a contour of a plane shape of an end of the yoke of the divided iron core piece adjacent to the divided iron core piece.

The method for manufacturing the laminated iron core may be configured so that an arc length of an outside diameter of the yoke of the divided iron core piece differs from an arc length of an outside diameter of the yoke of the divided iron core piece adjacent to the divided iron core piece.

The method for manufacturing the laminated iron core may be configured so that a contour of a plane shape of an end of the yoke of the divided iron core piece is a straight line extending in a radial direction of the annular iron core piece row.

In the divided iron core pieces constructing the annular iron core piece row according to the aspects of the present invention, when the divided iron core piece is laminated on the divided iron core piece adjacent to the divided iron core piece so that the plane shapes of both teeth overlap, the divided iron core pieces have the shapes in which the contours of the plane shapes of at least one ends of both yokes do not overlap. As a result, the multiple kinds of divided iron core pieces with different shapes constructing the divided laminated iron cores including the uneven parts on both circumferential ends can be manufactured in a single press step. The method for manufacturing the laminated iron core according to the aspect of the present invention can easily manufacture the laminated iron core constructed by mutually coupling the plurality of divided laminated iron cores including the uneven parts on both circumferential ends.

BRIEF DESCRIPTION OF THE DRAWINGS

In the accompanying drawings:

FIGS. 1A and 1B are plan views of an annular iron core piece row according to a first embodiment of the present invention, in which FIG. 1A is a plan view showing a state in which the annular iron core piece row is placed at a rotational angle of 0°, and FIG. 1B is a plan view showing a state in which the annular iron core piece row is placed at the rotational angle of 90°, respectively;

FIGS. 3A and 3B are plan views of an annular iron core piece row according to a second embodiment of the present invention, in which FIG. 3A is a plan view showing a state in which the annular iron core piece row is placed at a rotational angle of 0°, and FIG. 3B is a plan view showing a state in which the annular iron core piece row is placed at the rotational angle of 90°, respectively;

FIGS. 5A and 5B are plan views of an annular iron core piece row according to a third embodiment of the present invention, in which FIG. 5A is a plan view showing a state in which the annular iron core piece row is placed at a rotational angle of 0°, and FIG. 5B is a plan view showing a state in which the annular iron core piece row is placed at the rotational angle of 90°, respectively;

FIGS. 6A to 6C are plan views of an annular iron core piece row according to a fourth embodiment of the present invention, in which FIG. 6A is a plan view showing a state in which the annular iron core piece row is placed at a rotational angle of 0°, and FIG. 6B is a plan view showing a state in which the annular iron core piece row is placed at the rotational angle of 40°, and FIG. 6C is a plan view showing a state in which the annular iron core piece row is placed at the rotational angle of 80°, respectively;

FIGS. 8A to 8C are plan views of an annular iron core piece row according to a fifth embodiment of the present invention, in which FIG. 8A is a plan view showing a state in which the annular iron core piece row is placed at a rotational angle of 0°, and FIG. 8B is a plan view showing a state in which the annular iron core piece row is placed at the rotational angle of 40°, and FIG. 8C is a plan view showing a state in which the annular iron core piece row is placed at the rotational angle of 80°, respectively;

FIG. 10 is an explanatory diagram showing a configuration of a lamination apparatus according to a sixth embodiment of the present invention;

DETAILED DESCRIPTION OF THE EXEMPLARY EMBODIMENTS

First Embodiment

Figure 1A:
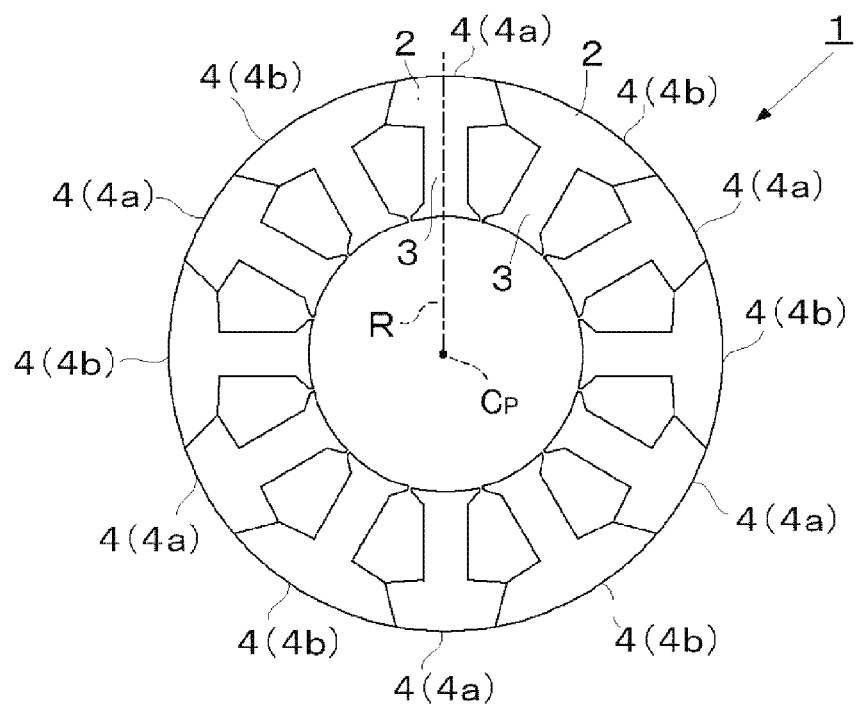

FIG. 1A is a plan view showing a state in which an annular iron core piece row 1 according to a first embodiment of the present invention is placed at a rotational angle of 0°. As shown in FIG. 1A, the annular iron core piece row 1 is configured by annularly arranging 12 divided iron core pieces 4 including yokes 2 and teeth 3. The yoke 2 is an arcuate region constructing an outer edge of the annular iron core piece row 1, and the tooth 3 is a region extending from the yoke 2 toward the center $C_P$ of the annular iron core piece row 1. The teeth 3 are arranged at pitches of 30° with respect to the center $C_P$ of the circumference of a circle. In addition, a line shown by numeral R is a virtual line which extends from the center $C_P$ in a radial direction of the circle and is fixed to the annular iron core piece row 1, and is a reference line showing the rotational angle of the annular iron core piece row 1.

The divided iron core pieces 4 have two kinds of divided iron core piece 4a and divided iron core piece 4b with different shapes of contours of both circumferential ends of the divided iron core piece 4, that is, both ends of the yoke 2, and the divided iron core pieces 4a and the divided iron core pieces 4b are alternately arranged in the circumferential direction. The contours of both ends of the yoke 2 of the divided iron core piece 4a have inclinations near to each other with distance from the center $C_P$. Contrarily, the contours of both ends of the yoke 2 of the divided iron core piece 4b have inclinations distant from each other with distance from the center $C_P$. The shape of the tooth 3 of the divided iron core piece 4a is identical to the shape of the tooth 3 of the divided iron core piece 4b.

Since the divided iron core piece 4a and the divided iron core piece 4b have the shapes as described above, the contours of plane shapes of both ends of the yokes 2 of the divided iron core piece 4a and the divided iron core piece 4b do not overlap when the divided iron core piece 4a is laminated on the divided iron core piece 4b so that plane shapes of the teeth 3 overlap. The contours of plane shapes of both ends of the yokes 2 of the divided iron core piece 4b and the divided iron core piece 4a do not overlap when the divided iron core piece 4b is laminated on the divided iron core piece 4a so that plane shapes of the teeth 3 overlap. Also, the annular iron core piece row 1 is configured by alternately arranging the divided iron core pieces 4a and the divided iron core pieces 4b. As a result, in all the divided iron core pieces 4 constructing the annular iron core piece row 1, when the divided iron core piece 4 is laminated on the adjacent divided iron core piece 4 so that plane shapes of the teeth 3 overlap, the contours of plane shapes of both ends of the yokes 2 of both of the divided iron core pieces 4 do not overlap.

Figure 1B:
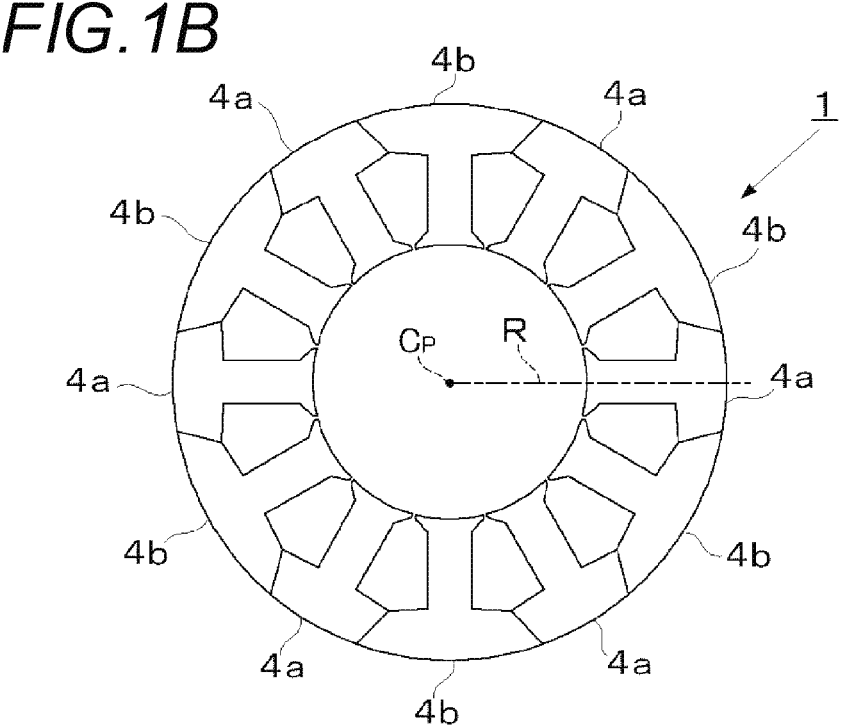

FIG. 1B is a plan view showing a state in which the annular iron core piece row 1 according to the first embodiment of the present invention is placed at the rotational angle of 90°. That is, FIG. 1B is the view showing a state in which the reference line R of the annular iron core piece row 1 described in FIG. 1A is rotated 90° clockwise using the center $C_P$ as the center of rotation. As is found from comparison between FIG. 1A and FIG. 1B, in the state shown in FIG. 1B, the divided iron core piece 4b is disposed in a position on the circumference in which the divided iron core piece 4a is disposed in the state shown in FIG. 1A, and the divided iron core piece 4a is disposed in a position on the circumference in which the divided iron core piece 4b is disposed in the state shown in FIG. 1A. Consequently, when the annular iron core piece row 1 placed in the state shown in FIG. 1B is stacked and placed on the annular iron core piece row 1 placed in the state shown in FIG. 1A, the divided iron core pieces 4b are placed on the divided iron core pieces 4a, and the divided iron core pieces 4a are placed on the divided iron core pieces 4b.

Figure 2A:
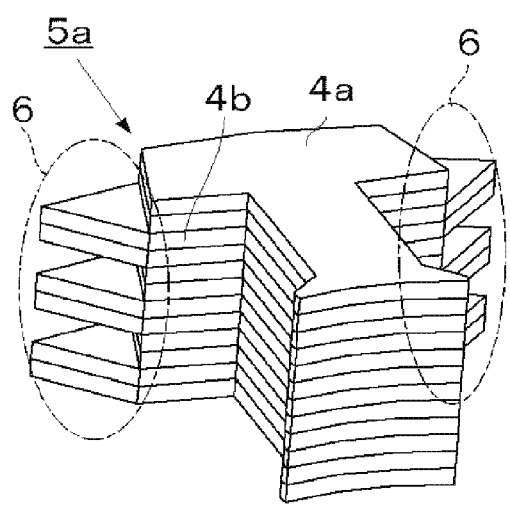
FIGS. 2A and 2B are perspective views showing shapes of divided laminated iron cores configured by laminating the annular iron core piece rows described in FIGS. 1A and 1B.
Figure 2B:
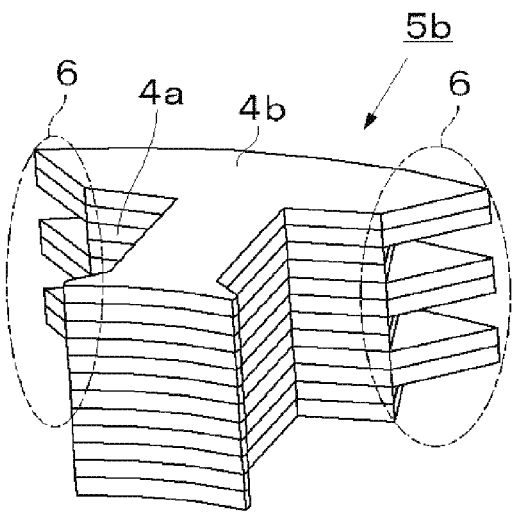

When the two annular iron core piece rows 1 placed in the state shown in FIG. 1A are laminated and the two annular iron core piece rows 1 placed in the state shown in FIG. 1B are laminated on the annular iron core piece rows 1 and then the annular iron core piece rows 1 placed in the state shown in FIG. 1A and the annular iron core piece rows 1 placed in the state shown in FIG. 1B are alternately laminated in twos, six divided laminated iron cores 5a shown in FIG. 2A and six divided laminated iron cores 5b shown in FIG. 2B are respectively formed. Since the divided iron core piece 4a and the divided iron core piece 4b have different shapes of the contours of both ends of the yokes 2 as described above, both ends of the divided laminated iron core 5a and the divided laminated iron core 5b are formed with uneven parts 6 as shown in FIGS. 2A and 2B. The uneven parts 6 formed on the mutually opposed ends of the divided laminated iron core 5a and the divided laminated iron core 5b are disposed in reverse uneven states in a lamination direction. As a result, the divided laminated iron core 5a and the divided laminated iron core 5b are coupled by mutually meshing the uneven parts 6. A total of 12 of the divided laminated iron cores 5a and the divided laminated iron cores 5b formed by laminating the annular iron core piece rows 1 are annularly alternately arranged to construct a laminated iron core (not shown). Since the divided laminated iron core 5a and the divided laminated iron core 5b are mutually coupled by mutually meshing the uneven parts 6, a shape of the laminated iron core configured by annularly arranging the divided laminated iron cores 5a and the divided laminated iron cores 5b is resistant to being lost at the time of detaching the laminated iron core from a lamination apparatus. Also, after windings are wound on the divided laminated iron cores 5a, 5b and the divided laminated iron cores 5a, 5b are again coupled, the shape of the laminated iron core is resistant to being lost.

Second Embodiment

Figure 3A:
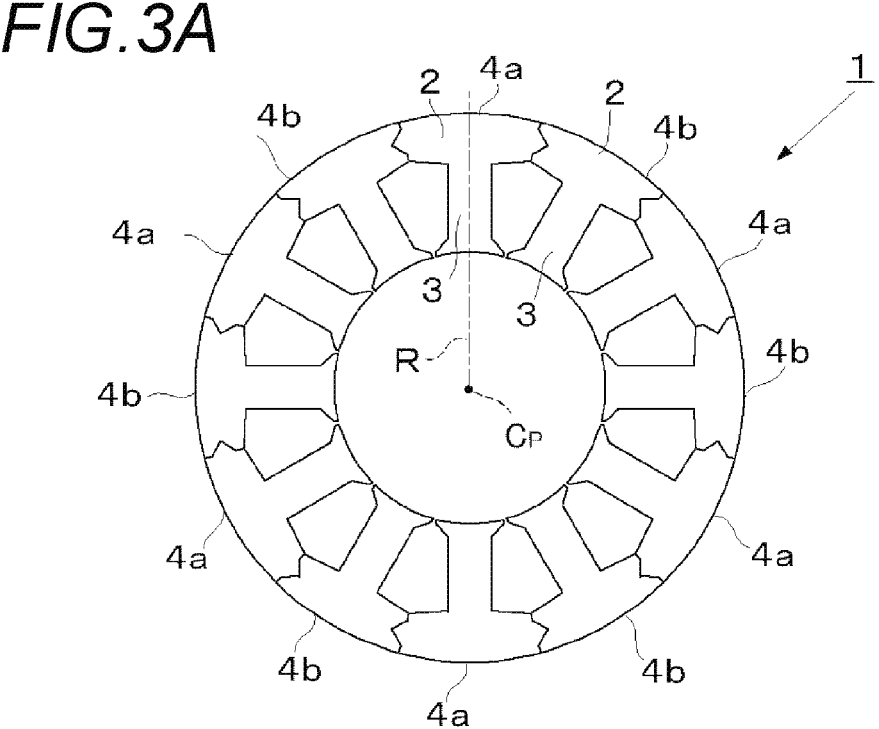
Figure 3B:
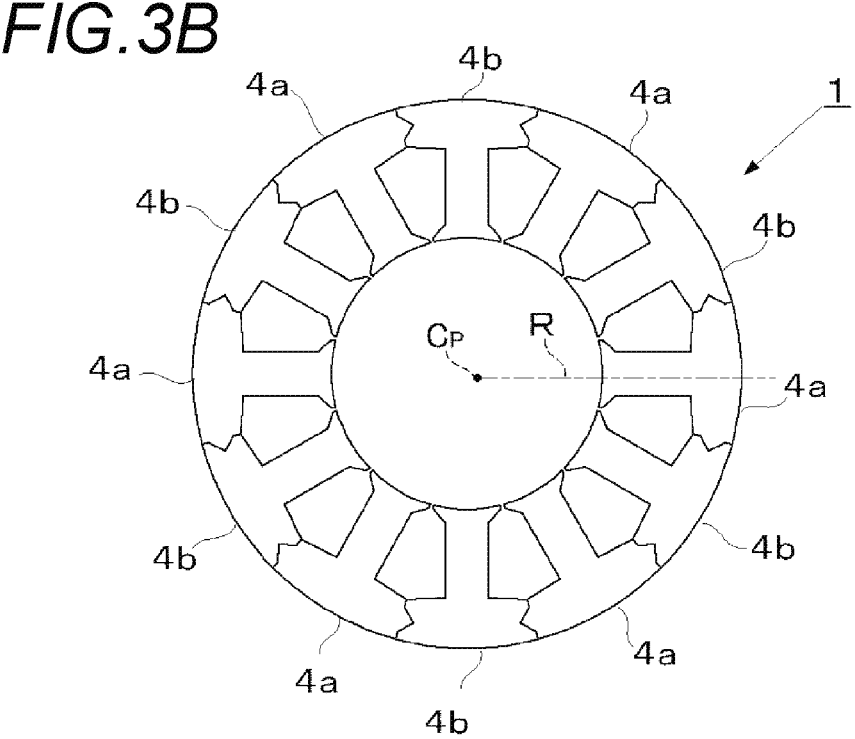

FIG. 3A is a plan view showing a state in which an annular iron core piece row 1 according to a second embodiment of the present invention is placed at a rotational angle of 0°. FIG. 3B is a plan view showing a state in which the annular iron core piece row 1 according to the second embodiment of the present invention is placed at the rotational angle of 90°. A basic configuration of the annular iron core piece row 1 according to the second embodiment is common to that of the annular iron core piece row 1 according to the first embodiment, but contours of the ends of yokes 2 of a divided iron core piece 4a and a divided iron core piece 4b differ from those of the annular iron core piece row 1 according to the first embodiment. As shown in FIGS. 3A and 3B, the end of the yoke 2 of the divided iron core piece 4a according to the second embodiment is formed with a triangular projection, and the end of the yoke 2 of the divided iron core piece 4b is formed with a triangular recess.

Figure 4A:
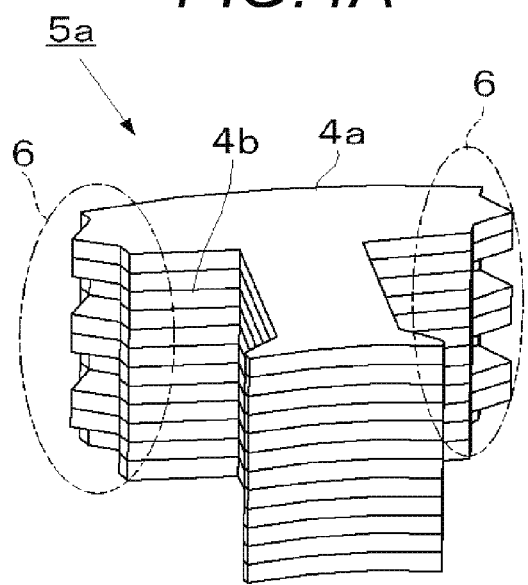
FIGS. 4A and 4B are perspective views showing shapes of divided laminated iron cores configured by laminating the annular iron core piece rows described in FIGS. 3A and 3B.
Figure 4B:
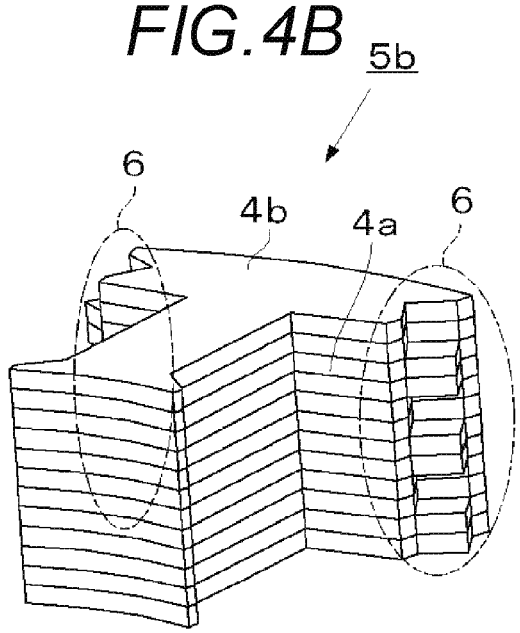

Like the case of the first embodiment, that is, when the annular iron core piece rows 1 placed in the state shown in FIG. 3A and the annular iron core piece rows 1 placed in the state shown in FIG. 3B are alternately laminated in twos, six divided laminated iron cores 5a shown in FIG. 4A and six divided laminated iron cores 5b shown in FIG. 4B are respectively formed. Both ends of the divided laminated iron core 5a and the divided laminated iron core 5b are formed with uneven parts 6. Also, as shown in FIGS. 4A and 4B, the uneven parts 6 formed on the mutually opposed ends of the divided laminated iron core 5a and the divided laminated iron core 5b are disposed in reverse uneven states in a lamination direction. As a result, since the divided laminated iron core 5a and the divided laminated iron core 5b are coupled by mutually meshing the uneven parts 6, a shape of a laminated iron core configured by annularly arranging the divided laminated iron cores 5a and the divided laminated iron cores 5b is resistant to being lost at the time of detaching the laminated iron core from a lamination apparatus. Also, after windings are wound on the divided laminated iron cores 5a, 5b and the divided laminated iron cores 5a, 5b are again coupled, the shape of the laminated iron core is resistant to being lost.

Third Embodiment

The first and second embodiments show the example in which a difference between the shapes of the yokes 2 of the divided iron core piece 4a and the divided iron core piece 4b is made by dissimilating the shape of the contour of the end of the yoke 2 of the divided iron core piece 4a from the shape of the contour of the end of the yoke 2 of the divided iron core piece 4b. However, a solution for forming both ends of the divided laminated iron cores 5a and the divided laminated iron cores 5b with the uneven parts 6 by making the difference between the shapes of the yokes 2 of the divided iron core piece 4a and the divided iron core piece 4b is not limited to this example. A third embodiment shows an example in which both ends of a divided laminated iron cores 5a and a divided laminated iron cores 5b are formed with uneven parts 6 by making a difference between shapes of yokes 2 of a divided iron core piece 4a and a divided iron core piece 4b by dissimilating an arc length of the yoke 2 of the divided iron core piece 4a from an arc length of the yoke 2 of the divided iron core piece 4b. In this case, a shape of a contour of the end of the yoke 2 of the divided iron core piece 4a may be equal to a shape of a contour of the end of the yoke 2 of the divided iron core piece 4b.

Figure 5A:
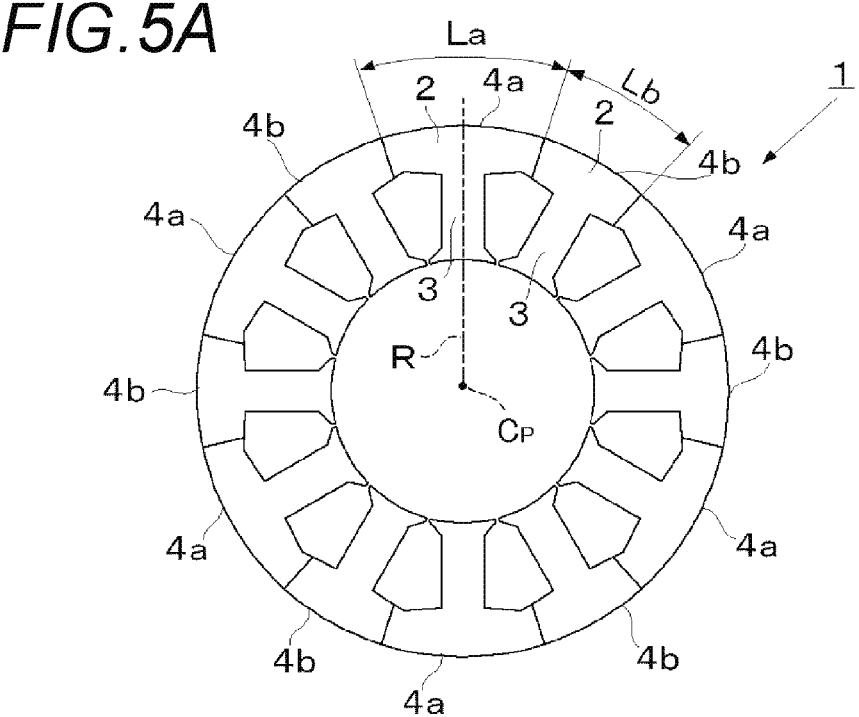
Figure 5B:
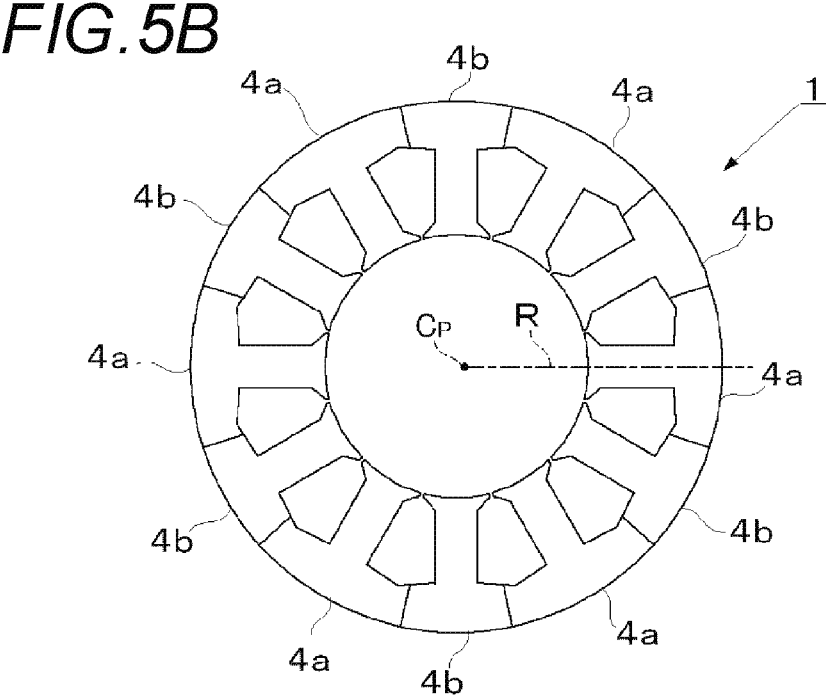

FIG. 5A is a plan view showing a state in which an annular iron core piece row 1 according to the third embodiment of the present invention is placed at a rotational angle of 0°. FIG. 5B is a plan view showing a state in which the annular iron core piece row 1 according to the third embodiment of the present invention is placed at the rotational angle of 90°. A basic configuration of the annular iron core piece row 1 according to the third embodiment is common to that of the annular iron core piece row 1 according to the first and second embodiments, but the shapes of the divided iron core piece 4a and the divided iron core piece 4b, particularly, the shapes of the contours of the ends of the yokes 2 differ from those of the annular iron core piece row 1 according to the first and second embodiments. As shown in FIGS. 5A and 5B, both of the contours of the ends of the divided iron core piece 4a and the divided iron core piece 4b according to the third embodiment are straight lines extending in a radial direction of the annular iron core piece row 1. As a result, the shape of the contour of the end of the yoke 2 of the divided iron core piece 4a is identical to the shape of the contour of the end of the divided iron core piece 4b. Instead, the arc length of the yoke 2 of the divided iron core piece 4a differs from the arc length of the yoke 2 of the divided iron core piece 4b. The arc length La of the yoke 2 of the divided iron core piece 4a is formed longer than the arc length Lb of the yoke 2 of the divided iron core piece 4b.

Since the divided iron core piece 4a and the divided iron core piece 4b according to the third embodiment have the shapes as described above, in all the divided iron core pieces 4 constructing the annular iron core piece row 1, when the divided iron core piece 4 is laminated on the adjacent divided iron core piece 4 so that plane shapes of teeth 3 of both of the divided iron core pieces 4 overlap, the contours of plane shapes of both ends of the yokes 2 of both of the divided iron core pieces 4 do not overlap. Consequently, when the annular iron core piece rows 1 placed in the state shown in FIG. 5A and the annular iron core piece rows 1 placed in the state shown in FIG. 5B are alternately laminated, the circumferential ends of the divided laminated iron cores (not shown) are formed with the uneven parts. As a result, since these divided laminated iron cores are mutually coupled by meshing the uneven parts, a shape of a laminated iron core configured by annularly arranging these divided laminated iron cores is resistant to being lost at the time of detaching the laminated iron core from a lamination apparatus. Also, after windings are wound on the divided laminated iron cores and the divided laminated iron cores are again coupled, the shape of the laminated iron core is resistant to being lost.

Fourth Embodiment

The first to third embodiments show the example in which the annular iron core piece row 1 is constructed of two kinds of divided iron core pieces 4a, 4b with different shapes when the annular iron core piece row 1 has 12 poles, that is, an even number of poles and the annular iron core piece row 1 is configured by annularly arranging 12 divided iron core pieces 4. However, when the annular iron core piece row 1 has an odd number of poles, that is, when the annular iron core piece row 1 is configured by annularly arranging an odd number of divided iron core pieces 4, in the case of alternately annularly arranging the divided iron core pieces 4a, 4b, a region in which the divided iron core pieces 4a or 4b are continuously arranged is formed. In order to avoid this problem, when the annular iron core piece row 1 is configured by annularly arranging an odd number of divided iron core pieces 4, the annular iron core piece row 1 could be constructed of three or more kinds of divided iron core pieces 4 with different shapes.

Figure 6A:
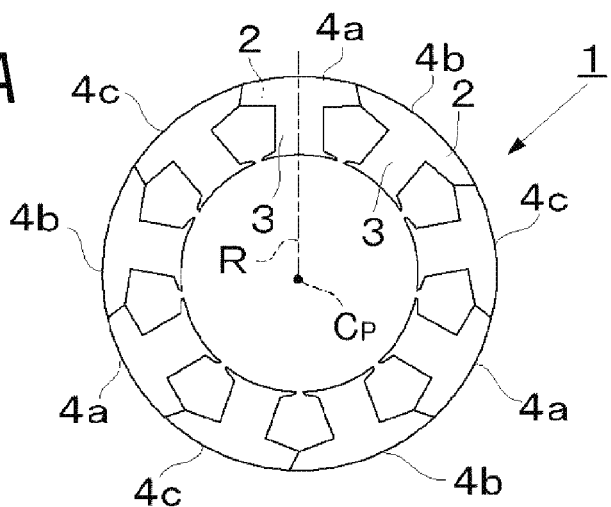
Figure 6B:
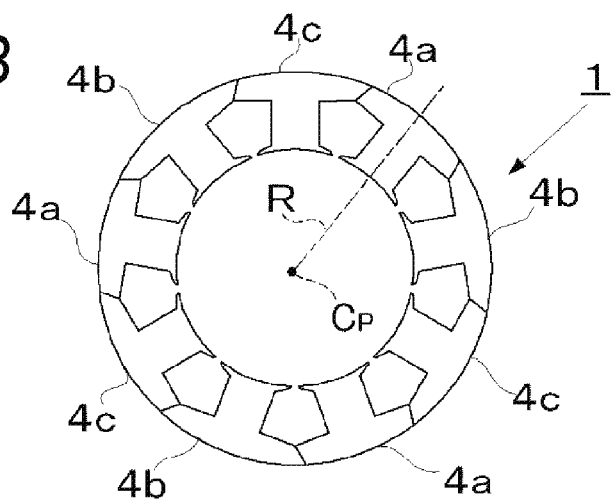
Figure 6C:
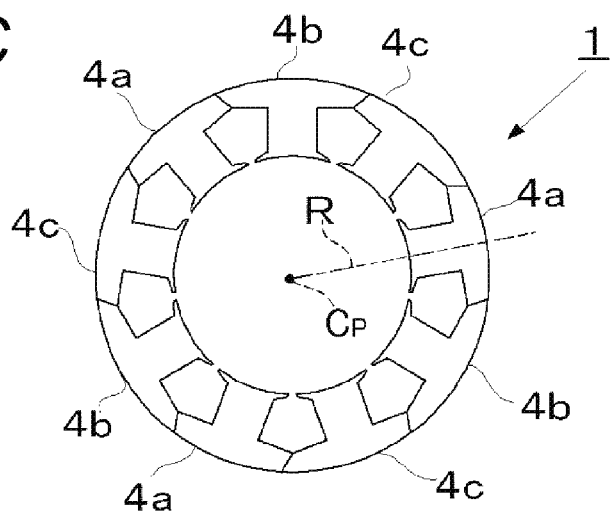

FIG. 6A is a plan view showing a state in which an annular iron core piece row 1 according to a fourth embodiment of the present invention is placed at a rotational angle of 0°. As shown in FIG. 6A, the annular iron core piece row 1 according to the fourth embodiment includes nine poles, and is configured by annularly arranging nine divided iron core pieces 4 (4a, 4b, 4c). The divided iron core pieces 4a, 4b, 4c are constructed so that a shape of at least one contour of the circumferential ends of a yoke 2 differs from the circumferential end of the corresponding yoke 2 of the different divided iron core piece 4 mutually. Also, FIG. 6B is a plan view showing a state in which the annular iron core piece row 1 according to the fourth embodiment of the present invention is placed at the rotational angle of 40°. FIG. 6C is a plan view showing a state in which the annular iron core piece row 1 according to the fourth embodiment of the present invention is placed at the rotational angle of 80°.

Figure 7A:
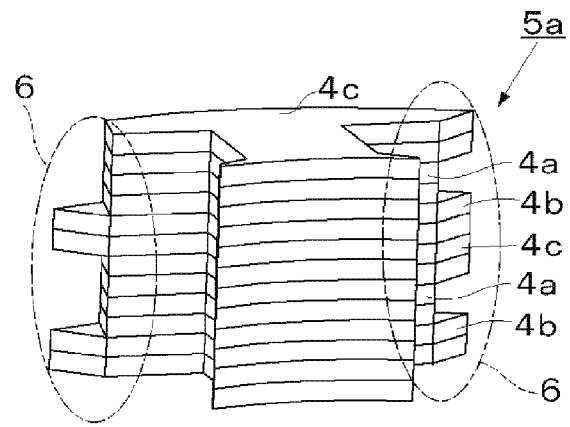
FIGS. 7A to 7C are perspective views showing shapes of divided laminated iron cores configured by laminating the annular iron core piece rows described in FIGS. 6A to 6C.
Figure 7B:
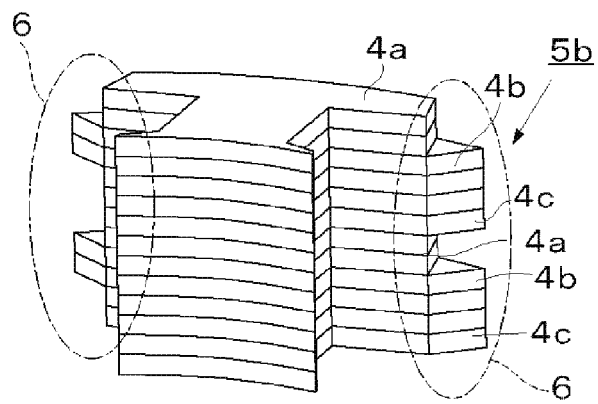
Figure 7C:
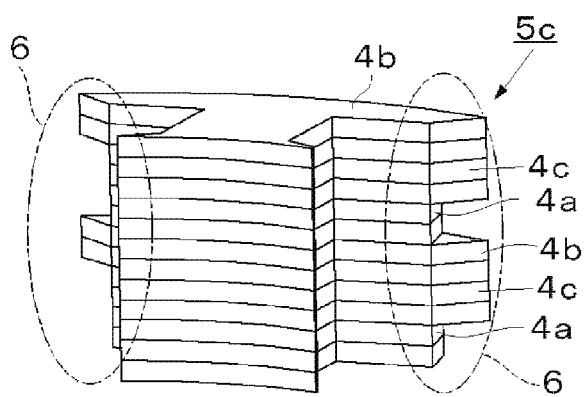

Since the annular iron core piece row 1 according to the fourth embodiment is constructed as described above, when the annular iron core piece row 1 placed in the state shown in FIG. 6A, the annular iron core piece row 1 placed in the state shown in FIG. 6B and the annular iron core piece row 1 placed in the state shown in FIG. 6C are laminated sequentially in twos and this is repeated, three divided laminated iron cores 5a shown in FIG. 7A, three divided laminated iron cores 5b shown in FIG. 7B and three divided laminated iron cores 5c shown in FIG. 7C are respectively formed. Both ends of the yokes 2 of the divided laminated iron core 5a, the divided laminated iron core 5b and the divided laminated iron core 5c are formed with uneven parts 6. Also, as shown in FIGS. 7A to 7C, the uneven parts 6 formed on the mutually opposed ends of the divided laminated iron core 5a, the divided laminated iron core 5b and the divided laminated iron core 5c are disposed in reverse uneven states in a lamination direction. As a result, since the divided laminated iron core 5a, the divided laminated iron core 5b and the divided laminated iron core 5c are coupled by mutually meshing the uneven parts 6. As a result, a shape of a laminated iron core configured by annularly arranging the divided laminated iron cores 5a, the divided laminated iron cores 5b and the divided laminated iron cores 5c is resistant to being lost at the time of detaching the laminated iron core from a lamination apparatus. Also, after windings are wound on the divided laminated iron cores 5a to 5c and then the divided laminated iron cores 5a to 5c are again coupled, the shape of the laminated iron core is resistant to being lost.

In addition, as shown in FIGS. 7A to 7C, in the divided iron core piece 4b and the divided iron core piece 4c, shapes of the left ends in the drawing are different, but shapes of the right ends in the drawing are equal. In the divided iron core piece 4c and the divided iron core piece 4a, shapes of the right ends in the drawing are different, but shapes of the left ends in the drawing are equal. Even in such a case, both circumferential ends of the divided laminated iron core 5a, the divided laminated iron core 5b and the divided laminated iron core 5c are formed with the uneven parts 6. Thus, in all the divided iron core pieces 4 constructing the annular iron core piece row 1, when the divided iron core piece 4 is laminated on the different divided iron core piece 4 adjacent to the divided iron core piece 4 in the annular iron core piece row 1 so that plane shapes of teeth 3 overlap, the divided iron core pieces 4 have only to have the shapes in which contours of plane shapes of at least one ends of the yokes 2 do not overlap.

Fifth Embodiment

The annular iron core piece row 1 which includes nine poles and is configured by annularly arranging nine divided iron core pieces 4 (4a, 4b, 4c) is not limited to the example shown in the fourth embodiment. A fifth embodiment shows another example of an annular iron core piece row 1 configured by annularly arranging nine divided iron core pieces 4 (4a, 4b, 4c).

Figure 8A:
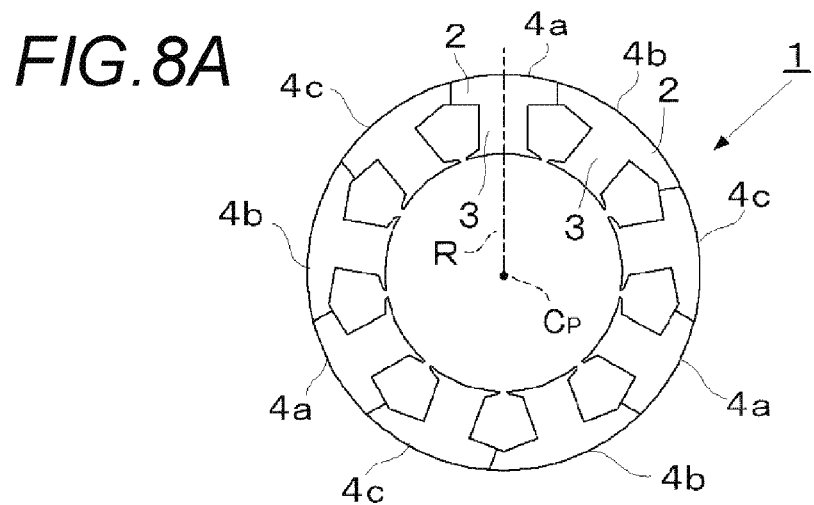
Figure 8B:
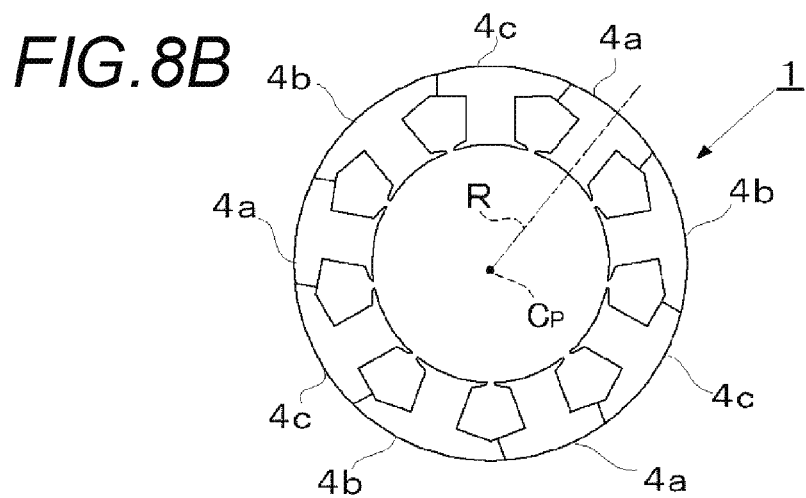
Figure 8C:
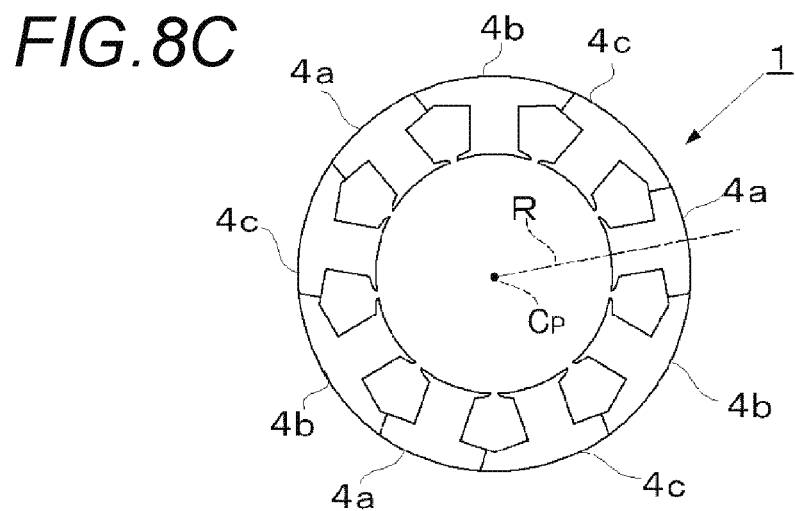

FIG. 8A is a plan view showing a state in which an annular iron core piece row 1 according to the fifth embodiment of the present invention is placed at a rotational angle of 0°. As shown in FIG. 8A, the divided iron core pieces 4a, 4b, 4c are constructed so that a shape of at least one contour of the circumferential ends of a yoke 2 differs from the circumferential end of the corresponding yoke 2 of the different divided iron core piece 4 mutually. Also, FIG. 8B is a plan view showing a state in which the annular iron core piece row 1 according to the fifth embodiment of the present invention is placed at the rotational angle of 40°. FIG. 8C is a plan view showing a state in which the annular iron core piece row 1 according to the fifth embodiment of the present invention is placed at the rotational angle of 80°.

Figure 9A:
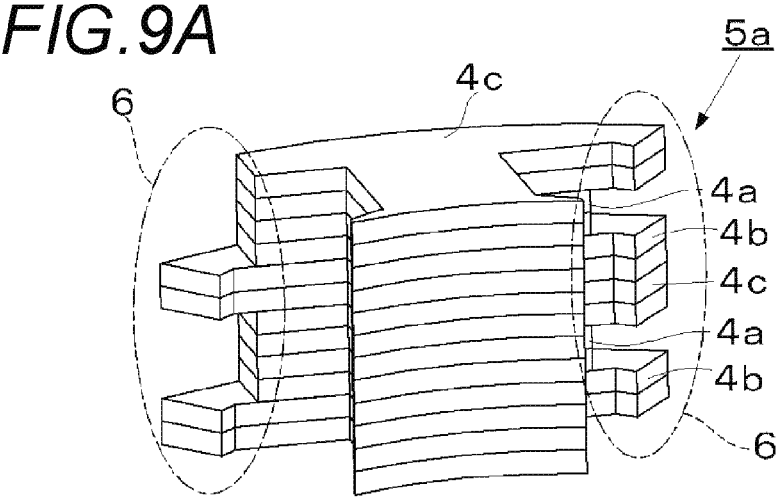
FIGS. 9A to 9C are perspective views showing shapes of divided laminated iron cores configured by laminating the annular iron core piece rows described in FIGS. 8A to 8C.
Figure 9B:
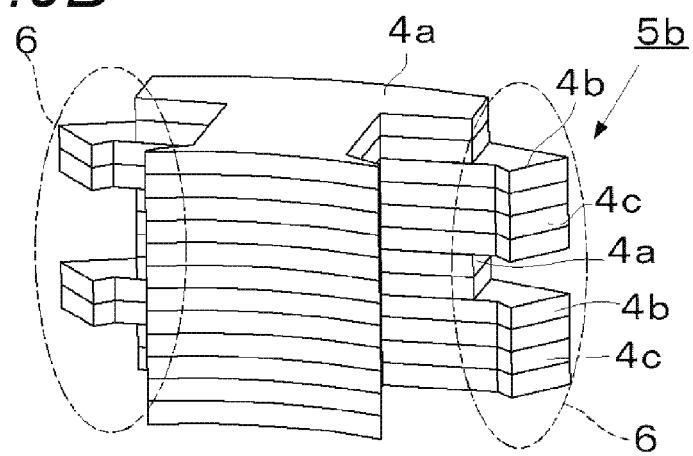
Figure 9C:
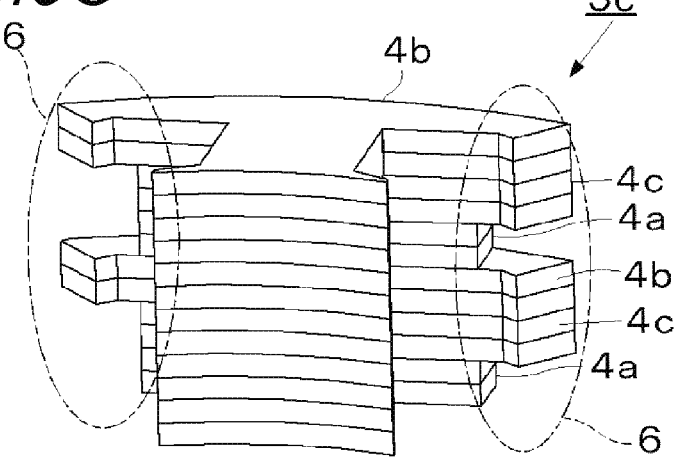

Since the annular iron core piece row 1 according to the fifth embodiment is constructed as described above, when the annular iron core piece row 1 placed in the state shown in FIG. 8A, the annular iron core piece row 1 placed in the state shown in FIG. 8B and the annular iron core piece row 1 placed in the state shown in FIG. 8C are laminated sequentially in twos and this is repeated, three divided laminated iron cores 5a shown in FIG. 9A, three divided laminated iron cores 5b shown in FIG. 9B and three divided laminated iron cores 5c shown in FIG. 9C are respectively formed. Both ends of the yokes 2 of the divided laminated iron core 5a, the divided laminated iron core 5b and the divided laminated iron core 5c are formed with uneven parts 6. Also, as shown in FIGS. 9A to 9C, the uneven parts 6 formed on the mutually opposed ends of the divided laminated iron core 5a, the divided laminated iron core 5b and the divided laminated iron core 5c are disposed in reverse uneven states in a lamination direction. As a result, since the divided laminated iron core 5a, the divided laminated iron core 5b and the divided laminated iron core 5c are coupled by mutually meshing the uneven parts 6. As a result, a shape of a laminated iron core configured by annularly arranging the divided laminated iron cores 5a, the divided laminated iron cores 5b and the divided laminated iron cores 5c is resistant to being lost at the time of detaching the laminated iron core from a lamination apparatus. Also, after windings are wound on the divided laminated iron cores 5a to 5c and then the divided laminated iron cores 5a to 5c are again coupled, the shape of the laminated iron core is resistant to being lost.

In addition, in the fifth embodiment, as shown in FIGS. 9A to 9C, in the divided iron core piece 4b and the divided iron core piece 4c, shapes of the left ends in the drawing are different, but shapes of the right ends in the drawing are equal. In the divided iron core piece 4c and the divided iron core piece 4a, shapes of the right ends in the drawing are different, but shapes of the left ends in the drawing are equal. Even in such a case, both circumferential ends of the divided laminated iron core 5a, the divided laminated iron core 5b and the divided laminated iron core 5c are formed with the uneven parts 6.

Sixth Embodiment

Finally a method for manufacturing a laminated iron core 7 using the annular iron core piece row 1 according to the first embodiment, that is, using the annular iron core piece row 1 in the state shown in FIG. 1A and the annular iron core piece row 1 in the state shown in FIG. 1B will be described. In addition, the method for manufacturing the laminated iron core described below is performed by an apparatus disposed inside a press die unit (not shown) or in the downstream side of the press die unit. A step to processing for cutting the annular iron core piece row 1 out of a strip plate is performed by the press die unit. See Patent Literature 1 for the details of the step to the processing for cutting the annular iron core piece row 1 out of the strip plate when necessary. Also, the annular iron core piece row 1 shown in FIG. 1A shows a state of the annular iron core piece row 1 conveyed from the step of cutting the annular iron core piece row 1 out of the strip plate to the next step, that is, the step of performing the method for manufacturing the laminated iron core described below. Hereinafter, the annular iron core piece row 1 in the state shown in FIG. 1A is called an annular iron core piece row 1a, and the annular iron core piece row 1 in the state shown in FIG. 1B is called an annular iron core piece row 1b. The step of cutting the annular iron core piece row 1 out of the strip plate is called a previous step.

FIG. 10 is an explanatory diagram showing a configuration of a lamination apparatus 9 for blanking the annular iron core piece row 1 from a strip plate 8 with the previous step completed and laminating the annular iron core piece rows 1. That is, FIG. 10 is the explanatory diagram showing the configuration of the apparatus for performing the method for manufacturing the laminated iron core 7 according to a sixth embodiment of the present invention. As shown in FIG. 10, the lamination apparatus 9 includes a press die 10 and a lamination die 11. The press die 10 is disposed over the strip plate 8 in FIG. 10, and is constructed so as to be driven by a driving apparatus (not shown) and blank the annular iron core piece row 1 from the strip plate 8. The lamination die 11 is a cylindrical die unit disposed as opposed to the press die 10 with the strip plate 8 sandwiched between the lamination die 11 and the press die 10. The annular iron core piece rows 1 blanked from the strip plate 8 are pushed into the lamination die 11, and are held and laminated in the lamination die 11. The lamination die 11 is rotated and driven by a rotary driving apparatus (not shown) and is rotated around a rotational axis A. Since the annular iron core piece rows 1 laminated in the lamination die 11 are held in the lamination die 11, the annular iron core piece rows 1 together with the lamination die 11 are rotated around the rotational axis A. Since the lamination apparatus 9 is constructed in this manner, the lamination apparatus 9 can change a rotational angle of the newly laminated annular iron core piece row 1 relatively to the immediately previously laminated annular iron core piece row 1.

In addition, a receiving table 12 is disposed inside the lamination die 11. The receiving table 12 is upwardly and downwardly moved and driven by an upward and downward movement driving apparatus (not shown), and is upwardly and downwardly moved according to the height of the annular iron core piece rows 1 laminated inside the lamination die 11. That is, the receiving table 12 is constructed so as to be downwardly moved by the thickness of one annular iron core piece row 1 every time the annular iron core piece row 1 is laminated. Also, see JP-A-2013-115942 for the details of the concrete configuration of the lamination apparatus 9 when necessary.

FIGS. 11A to 11F are explanatory diagrams describing the method for manufacturing the laminated iron core 7 performed by using the lamination apparatus 9, that is, the method for manufacturing the laminated iron core 7 according to the sixth embodiment of the present invention in a time series. Hereinafter, the method for manufacturing the laminated iron core 7 will be described with reference to FIGS. 11A to 11F.

(First Laminating Step)

Figure 11A:
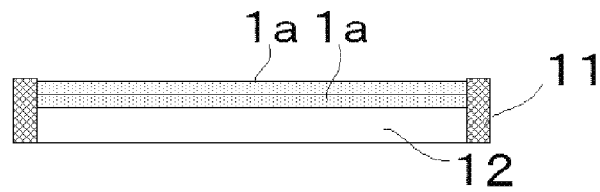
FIGS. 11A to 11F describe a method for manufacturing a laminated iron core according to the sixth embodiment of the present invention, and show processes of manufacturing the laminated iron core in a time series.

First, a first blanked annular iron core piece row 1a is pushed into the lamination die 11, and is placed on the receiving table 12. Next, when an annular iron core piece row 1a is blanked, its annular iron core piece row 1a is placed on the annular iron core piece row 1a first placed on the receiving table and is laminated. That is, in a first laminating step, two sets of annular iron core piece rows 1a are laminated in the lamination die 11 as shown in FIG. 11A.

(Second Laminating Step)

Figure 11B:
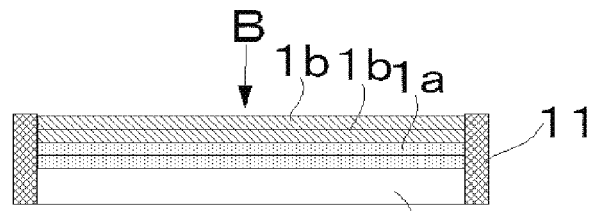

After the first laminating step is completed, the lamination die 11 is rotated 90° around the rotational axis A in a counterclockwise direction when the lamination die 11 is viewed from above, that is, when the lamination die 11 is viewed from a direction shown by arrow B in FIG. 11B. Since the lamination die 11 is rotated in this manner, an annular iron core piece row 1 blanked from the strip plate 8 and laminated in a second laminating step is in a state rotated 90° in a clockwise direction relatively to the annular iron core piece rows 1a laminated in the first laminating step. As a result, the annular iron core piece rows 1 laminated in the second laminating step are in a state shown in FIG. 1B. That is, in the second laminating step, an annular iron core piece row 1b is first laminated on the annular iron core piece rows 1a laminated in the first laminating step. Next, another annular iron core piece row 1b is laminated on the previously laminated annular iron core piece row 1b. As a result, as shown in FIG. 11B, two sets of annular iron core piece rows 1b are laminated on the two sets of annular iron core piece rows 1a laminated in the first laminating step.

(Third to Sixth Laminating Steps)

Figure 11C:
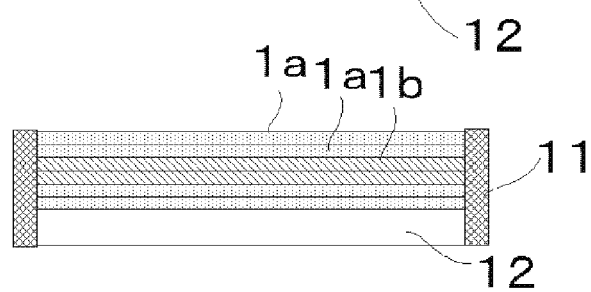
Figure 11D:
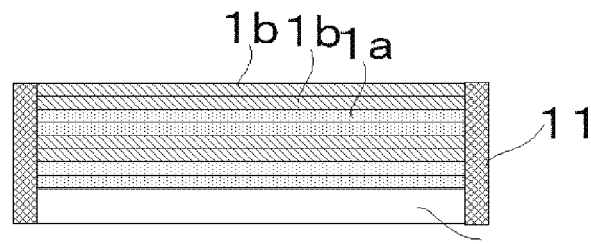
Figure 11E:
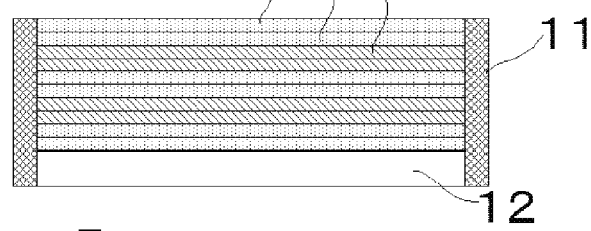
Figure 11F:
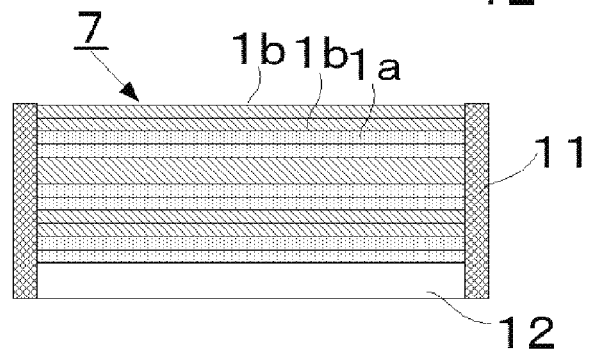

Subsequently, in like manner, two sets of annular iron core piece rows 1a and two sets of annular iron core piece rows 1b are alternately laminated. That is, in a third laminating step, as shown in FIG. 11C, two sets of annular iron core piece rows 1a are laminated on the two sets of annular iron core piece rows 1b laminated in the second laminating step. In a fourth laminating step, as shown in FIG. 11D, two sets of annular iron core piece rows 1b are laminated on the two sets of annular iron core piece rows 1a laminated in the third laminating step. In a fifth laminating step, as shown in FIG. 11E, two sets of annular iron core piece rows 1a are laminated on the two sets of annular iron core piece rows 1b laminated in the fourth laminating step. In a sixth laminating step, as shown in FIG. 11F, two sets of annular iron core piece rows 1b are laminated on the two sets of annular iron core piece rows 1a laminated in the fifth laminating step. As described above, the laminated iron core 7 is completed through the first to sixth laminating steps.

Figure 12:
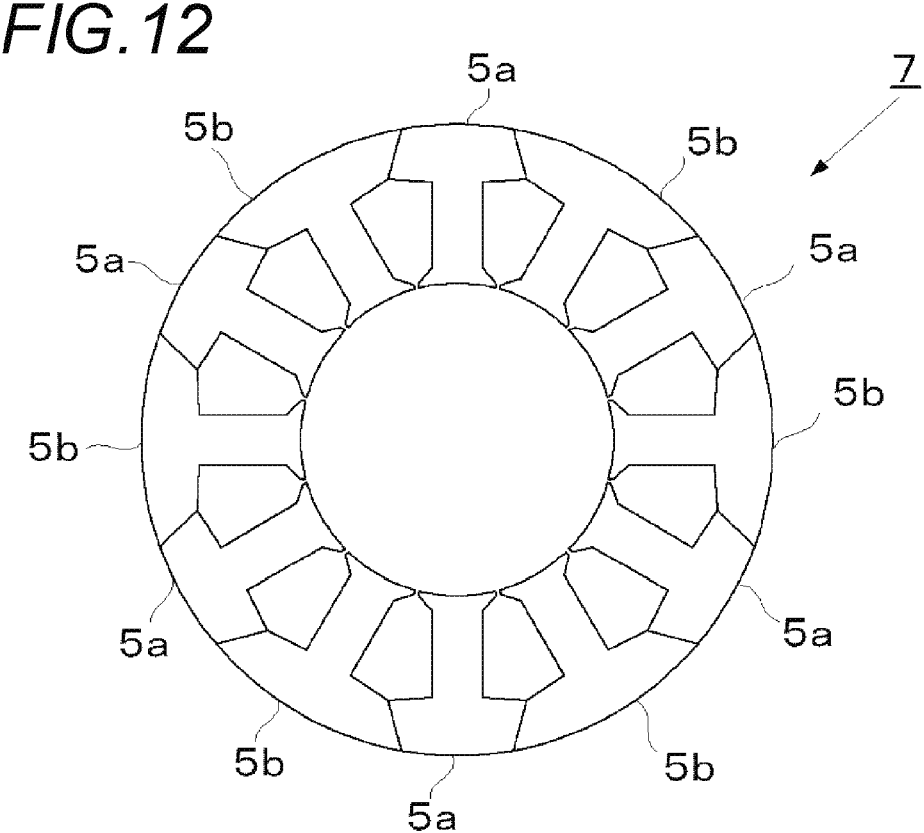
FIG. 12 is a plan view of the laminated iron core manufactured through the manufacturing processes shown in FIGS. 11A to 11F.

FIG. 12 is a plan view of the laminated iron core 7 manufactured by the manufacturing method according to the present embodiment. As shown in FIG. 12, the laminated iron core 7 includes six divided laminated iron cores 5a shown in FIG. 2A and six divided laminated iron cores 5b shown in FIG. 2B, respectively. Also, the divided laminated iron cores 5a and the divided laminated iron cores 5b are alternately annularly arranged.

As described above, the annular iron core piece row 1 shown in each of the embodiments can be manufactured in a single step, that is, without separately providing the steps of manufacturing the divided iron core pieces 4a, 4b, 4c with different shapes, respectively. According to the method for manufacturing the laminated iron core shown in each of the embodiments described above, by changing the rotational angle of the annular iron core piece row 1 and laminating the annular iron core piece rows 1, both circumferential ends of the divided laminated iron cores 5a, 5b, 5c can be formed with the uneven parts 6, and the laminated iron core 7 formed by mutually coupling the divided laminated iron cores 5a, 5b, 5c can be manufactured.

As a result, according to the embodiments described above, the laminated iron core can be manufactured by relatively inexpensive equipment since the manufacturing steps of the divided iron core pieces 4a, 4b, 4c and the laminated iron core 7 can be rationalized.

However, the technical scope of the present invention is not limited by the description of the embodiments described above. The present invention can be implemented by freely making applications, modifications or improvements within the technical idea described in the claims.

Each of the embodiments described above shows the example of the annular iron core piece row 1 including two kinds of divided iron core pieces 4 (4a, 4b) and three kinds of divided iron core pieces 4 (4a, 4b, 4c) with different shapes, but the divided iron core pieces 4 included by the annular iron core piece row 1 are not limited to the example distinguished into the two kinds and the three kinds by the shapes. The annular iron core piece row 1 may include four or more kinds of divided iron core pieces 4 with different shapes.

Each of the embodiments described above shows the example in which the laminated iron core 7 includes twelve teeth 3 and the example in which the laminated iron core 7 includes nine teeth 3, that is, the example in which the annular iron core piece row 1 is constructed of twelve divided iron core pieces 4 and the example in which the annular iron core piece row 1 is constructed of nine divided iron core pieces 4, but the laminated iron core 7 and the annular iron core piece row 1 to which the present invention is applied are not limited to such examples. The number of teeth 3 included by the laminated iron core 7 and the number of divided iron core pieces 4 constructing the annular iron core piece row 1 are freely selected.

The shapes of the divided iron core pieces 4 (4a, 4b, 4c) shown in each of the embodiments described above, particularly, the shapes of the contours of the ends of the yoke 2 are illustrative. The technical scope of the present invention is not limited by the shapes of the divided iron core pieces 4 (4a, 4b, 4c) shown in each of the embodiments described above.

The sixth embodiment describes that the annular iron core piece rows 1 are laminated in twos in the first to sixth laminating steps, but the number of annular iron core piece rows 1 laminated in each of the laminating steps is not limited to two. The annular iron core piece rows 1 may be laminated in groups of three or more in each of the laminating steps. Also, the number of annular iron core piece rows 1 laminated in each of the laminating steps may differ from one laminating step to another. For example, it may be constructed so that the annular iron core piece rows 1 are laminated in twos in the first and sixth laminating steps and the annular iron core piece rows 1 are laminated in threes in the second and third laminating steps.

The annular iron core piece row 1 may be laminated one by one in each of the laminating steps. That is, it may be constructed so that every time one annular iron core piece row 1 is laminated, the lamination die 11 is rotated around the rotational axis A and the rotational angle of the annular iron core piece row 1 held in the lamination die 11 is changed.

Each of the embodiments described above shows the example of changing the rotational angle of the annular iron core piece rows 1 previously laminated and held in the lamination die 11, but a solution for changing the rotational angle of the newly laminated annular iron core piece row 1 relatively to the lastly laminated annular iron core piece row 1 is not limited to such an example. It may be constructed so that the rotational angle of the previously laminated annular iron core piece rows 1 is fixed and the rotational angle of the newly laminated annular iron core piece row 1 is changed.

Each of the embodiments described above does not refer to a solution for mutually coupling the laminated divided iron core pieces 4 (4a, 4b, 4c), but such coupling solution is not particularly limited. The divided iron core pieces 4 (4a, 4b, 4c) may be coupled by caulking or welding. Alternatively, the divided iron core pieces 4 (4a, 4b, 4c) may be mutually coupled by using an adhesive.

The first to third embodiments show the examples (FIG. 1B, FIG. 3B, FIG. 5B) of rotating the annular iron core piece row 1 by 90°, and the fourth and fifth embodiments show the examples (FIG. 6B, FIG. 8B) of rotating the annular iron core piece row 1 by 40° and the examples (FIG. 6C, FIG. 8C) of rotating the annular iron core piece row 1 by 800. But, the angle at which the annular iron core piece row 1 is rotated is not limited to these angles. As long as the angle is an angle at which the plane shapes of the teeth 3 exactly overlap and the angle at which the divided iron core pieces 4 with the same shape are not laminated vertically, that is, then angle at which the divided iron core piece 4a and the divided iron core piece 4a, the divided iron core piece 4b and the divided iron core piece 4b, and the divided iron core piece 4c and the divided iron core piece 4c are not laminated vertically, any angle may be used. For example, in the first embodiment, the state shown in FIG. 1B is caused in the case of rotating the annular iron core piece row 1 30°, 90°, 150°, 210°, 270°, and 330° using the center $C_P$ as the center of rotation.

The reference numerals and signs are listed below correspondingly to the elements of the embodiments:
1 (1a, 1b): ANNULAR IRON CORE PIECE ROW
2: YOKE
3: TOOTH
4 (4a, 4b, 4c): DIVIDED IRON CORE PIECE
5 (5a, 5b, 5c): DIVIDED LAMINATED IRON CORE
6: UNEVEN PART
7: LAMINATED IRON CORE
8: STRIP PLATE
9: LAMINATION APPARATUS
10: PRESS DIE
11: LAMINATION DIE
12: RECEIVING TABLE

What is claimed is:

1. A method for manufacturing a laminated iron core, comprising:
   providing a plurality of annular iron core piece rows, each of which is configured by annularly arranging a plurality of divided iron core pieces including yokes and teeth so as to mutually abut ends of the yokes, wherein the yokes of annularly-adjacent divided iron core pieces in the annular iron core piece row are mutually different in shape;
   repeating the following processes:
      laminating the annular iron core piece rows by a certain number so that at least one of the plurality of annular iron core piece rows having the plurality of divided iron core pieces is laminated to at least another of the plurality of annular iron core piece rows having the plurality of divided iron core pieces, wherein each of the divided iron core pieces of the at least one of the plurality of annular iron core piece rows is superposed on a corresponding one of the divided iron core pieces of the at least another of the plurality of annular iron core piece rows that has a same shape, thereby providing the annular iron core piece rows which have been laminated by the certain number,
      changing a rotational angle of a newly laminated annular iron core piece row relatively to a lastly laminated annular iron core piece row by rotating a lamination die,
      laminating the newly laminated annular iron core piece row onto the lastly laminated annular iron core piece row after the relative changing of the rotational angle, and
      wherein each of the divided iron core pieces of the newly laminated annular iron core piece row is directly superposed on a corresponding one of divided iron core pieces of the lastly laminated annular iron core piece row that has a different shape; and
   wherein the ends of the yokes which are both circumferential ends of the divided iron core pieces that provide the lastly laminated annular iron core piece row and the newly laminated annular iron core piece row are formed in a single press station without applying a plurality of press stations before cutting the annular iron core piece rows out of a strip plate.

2. The method for manufacturing the laminated iron core according to claim 1, wherein the rotational angle of the newly laminated annular iron core piece row is changed relatively to the lastly laminated annular iron core piece row by changing the rotational angle of the lastly laminated annular iron core piece row.

3. The method for manufacturing the laminated iron core according to claim 1, wherein a contour of a plane shape of at least one end of a yoke of at least one divided iron core piece of the plurality of divided iron core pieces differs from a contour of a plane shape of an end of a yoke of another divided iron core piece adjacent to the at least one divided iron core piece.

4. The method for manufacturing the laminated iron core according to claim 1, wherein an arc length of an outside diameter of a yoke of at least one divided iron core piece of the plurality of divided iron core pieces differs from an arc length of an outside diameter of a yoke of another divided iron core piece adjacent to the at least one divided iron core piece.

5. The method for manufacturing the laminated iron core according to claim 4, wherein a contour of a plane shape of an end of the yoke of the at least one divided iron core piece is a straight line extending in a radial direction of the annular iron core piece row.

6. The method for manufacturing the laminated iron core according to claim 1, wherein the providing of the plurality of annular iron core piece rows includes performing a sequence of press steps to cut the annular iron core piece rows out of the strip plate, such that the yokes of the annularly-adjacent divided iron core pieces in the annular iron core piece row are formed to be mutually different in the shape, and wherein the lastly laminated annular iron core piece row and the newly laminated annular iron core piece row are provided by the sequence of press steps.

7. A method for manufacturing a laminated iron core, comprising:

providing a plurality of annular iron core piece rows, each of which is configured by annularly arranging a plurality of divided iron core pieces including yokes and teeth so as to mutually abut ends of the yokes, wherein the yokes of annularly-adjacent divided iron core pieces among the divided iron core pieces in the annular iron core piece row are mutually different in shape; and repeating the following processes:

placing at least one of the annular iron core piece rows, changing a rotational angle of a newly laminated annular iron core piece row relative to a lastly laminated annular iron core piece row by rotating a lamination die, laminating the newly laminated annular iron core piece row onto the lastly laminated annular iron core piece row after the relative changing of the rotational angle, and wherein each of the divided iron core pieces of the newly laminated annular iron core piece row is directly superposed on a corresponding one of the divided iron core pieces of the lastly laminated annular iron core piece row that has a different shape; and wherein the ends of the yokes which are both circumferential ends of the divided iron core pieces that provide the lastly laminated annular iron core piece row and the newly laminated annular iron core piece row are formed in a single press station without applying a plurality of press stations before cutting the annular iron core piece rows out of a strip plate.

8. The method for manufacturing the laminated iron core according to claim 7, wherein the rotational angle of the newly laminated annular iron core piece row is changed relatively to the lastly laminated annular iron core piece row by changing the rotational angle of the lastly laminated annular iron core piece row.

9. The method for manufacturing the laminated iron core according to claim 7, wherein a contour of a plane shape of at least one end of a yoke of at least one divided iron core piece of the plurality of divided iron core pieces differs from a contour of a plane shape of an end of a yoke of another divided iron core piece adjacent to the at least one divided iron core piece.

10. The method for manufacturing the laminated iron core according to claim 7, wherein an arc length of an outside diameter of a yoke of at least one divided iron core piece of the plurality of divided iron core pieces differs from an arc length of an outside diameter of a yoke of another divided iron core piece adjacent to the at least one divided iron core piece.

11. The method for manufacturing the laminated iron core according to claim 10, wherein a contour of a plane shape of an end of the yoke of the at least one divided iron core piece is a straight line extending in a radial direction of the annular iron core piece row.

12. The method for manufacturing the laminated iron core according to claim 7, wherein the providing of the plurality of annular iron core piece rows includes performing a sequence of press steps to cut the annular iron core piece rows out of the strip plate, such that the yokes of the annularly-adjacent divided iron core pieces in the annular iron core piece row are formed to be mutually different in the shape, and wherein the lastly laminated annular iron core piece row and the newly laminated annular iron core piece row are provided by the sequence of press steps.

13. A method for manufacturing a laminated iron core, comprising:

providing a plurality of annular iron core piece rows, each of which is configured by annularly arranging a plurality of divided iron core pieces including yokes and teeth so as to mutually abut ends of the yokes, wherein the yokes of annularly-adjacent divided iron core pieces in the annular iron core piece row are mutually different in shape;

repeating the following processes:

laminating the annular iron core piece rows by a certain number so that at least one of the plurality of annular iron core piece rows having the plurality of divided iron core pieces is laminated to at least another of the plurality of annular iron core piece rows having the plurality of divided iron core pieces, wherein each of the divided iron core pieces of the at least one of the plurality of annular iron core piece rows is superposed on a corresponding one of the divided iron core pieces of the at least another of the plurality of annular iron core piece rows that has a same shape, thereby providing the annular iron core piece rows which have been laminated by the certain number, changing a rotational angle of a newly laminated annular iron core piece row relatively to a lastly laminated annular iron core piece row by rotating a lamination die, laminating the newly laminated annular iron core piece row onto the lastly laminated annular iron core piece row after the relative changing of the rotational angle, and wherein each of the divided iron core pieces of the newly laminated annular iron core piece row is directly superposed on a corresponding one of divided iron core pieces of the lastly laminated annular iron core piece row that has a different shape; and wherein, in the providing of the lastly laminated annular iron core piece row and the newly laminated annular iron core piece row, the ends of the yokes which are both circumferential ends of the divided iron core pieces are formed in a single press station without skipping any other press stations among multiple press stations before cutting the annular iron core piece rows out of a strip plate.

14. The method for manufacturing the laminated iron core according to claim 13, wherein the rotational angle of the newly laminated annular iron core piece row is changed relatively to the lastly laminated annular iron core piece row by changing the rotational angle of the lastly laminated annular iron core piece row.

15. A method for manufacturing a laminated iron core, comprising:

providing a plurality of annular iron core piece rows, each of which is configured by annularly arranging a plurality of divided iron core pieces including yokes and teeth so as to mutually abut ends of the yokes, wherein the yokes of annularly-adjacent divided iron core pieces among the divided iron core pieces in the annular iron core piece row are mutually different in shape; and repeating the following processes:

placing at least one of the annular iron core piece rows, changing a rotational angle of a newly laminated annular iron core piece row relative to a lastly laminated annular iron core piece row by rotating a lamination die, laminating the newly laminated annular iron core piece row onto the lastly laminated annular iron core piece row after the relative changing of the rotational angle, and wherein each of the divided iron core pieces of the newly laminated annular iron core piece row is directly superposed on a corresponding one of the divided iron core pieces of the lastly laminated annular iron core piece row that has a different shape; and wherein, in the providing of the lastly laminated annular iron core piece row and the newly laminated annular iron core piece row, the ends of the yokes which are both circumferential ends of the divided iron core pieces are formed in a single press station without skipping any other press stations among multiple press stations before cutting the annular iron core piece rows out of a strip plate.

16. The method for manufacturing the laminated iron core according to claim 15, wherein the rotational angle of the newly laminated annular iron core piece row is changed relatively to the lastly laminated annular iron core piece row by changing the rotational angle of the lastly laminated annular iron core piece row.

* * * * *